US008424613B2

(12) United States Patent
Hurley

(10) Patent No.: US 8,424,613 B2
(45) Date of Patent: Apr. 23, 2013

(54) AERATOR FOR ZERO TURN LAWN EQUIPMENT

(75) Inventor: Robert E. Hurley, Durham, NC (US)

(73) Assignee: UTECO, Inc., Richmond, VA (US)

( * ) Notice: Subject to any disclaimer, the term of this patent is extended or adjusted under 35 U.S.C. 154(b) by 40 days.

(21) Appl. No.: 12/708,853

(22) Filed: Feb. 19, 2010

(65) Prior Publication Data

US 2011/0203816 A1 Aug. 25, 2011

(51) Int. Cl.
*A01B 45/02* (2006.01)

(52) U.S. Cl.
USPC .......... 172/21

(58) Field of Classification Search .......... 172/21, 172/22
See application file for complete search history.

(56) References Cited

U.S. PATENT DOCUMENTS

| | | | | |
|---|---|---|---|---|
| 3,570,604 | A | 3/1971 | Allard et al. | |
| 4,094,363 | A | 6/1978 | McCoomb | |
| 4,158,391 | A | 6/1979 | Clements | |
| 4,424,868 | A * | 1/1984 | Staniforth et al. | 172/21 |
| 4,776,404 | A | 10/1988 | Rogers et al. | |
| 4,840,232 | A | 6/1989 | Mayer | |
| 5,101,910 | A | 4/1992 | Dawson | |
| 5,586,604 | A | 12/1996 | Postema | |
| 6,241,025 | B1 | 6/2001 | Myers et al. | |
| 6,415,872 | B2 | 7/2002 | Myers et al. | |
| 6,659,190 | B2 * | 12/2003 | Jessen | 172/21 |
| 6,832,657 | B1 | 12/2004 | LaFlair | |
| 7,172,032 | B2 | 2/2007 | McKinley et al. | |
| 7,591,323 | B2 | 9/2009 | Wynings | |

FOREIGN PATENT DOCUMENTS

JP 308103 A 11/1995

OTHER PUBLICATIONS

GatorRator The World's Fastest ZTR Aerator; www.gator-rator.com; pending U.S. Appl. No. 10/151,554.
Country ZTR Equipment; http://www.countryztr.com/lawnaerators.htm; copyright 2006-2008 Contry ZTR Equipment.
JRCO Heavy-duty Attachments for Commercial Mowers; Hooker™ Soft-Plug Aerator Model 751; http://www.jrconinc.com/product.asp?id=1.
TRAC VAC Front Mnt. Core Plug Aerator; http://trac-vac.com/index_files/FMAerators.htm; Copyright © 2008 Palmor Products Inc.

* cited by examiner

*Primary Examiner* — Jamie L McGowan
(74) *Attorney, Agent, or Firm* — Olive & Olive, P.A.

(57) ABSTRACT

An aerator attachment for a zero turn riding lawn mower equipment comprising a cross frame assembly pivotally connected to the mounting means at least one caster assembly, each rotatable and independently mounted onto the cross frame assembly, the caster assembly comprising a means for retaining at least one tine fork independently and rotatable thereon; and an actuating mechanism mounted such that when the tine forks are engaged the front end of the lawn equipment is lifted off of the ground.

17 Claims, 6 Drawing Sheets

10 12 62 50 54 52 30 55 14 20 24 16 32 34 40 47 48 47 47

AERATOR FOR ZERO TURN LAWN EQUIPMENT

FIELD OF THE INVENTION

This invention relates generally to an aerator for aerating soil, and more particularly, the invention relates to an aerator that attaches to a piece of mechanized lawn care equipment for aerating the lawn as the lawn care equipment travels over the lawn.

CROSS-REFERENCE TO RELATED APPLICATIONS

Not applicable.

BACKGROUND OF THE INVENTION

Zero turn riding lawn mowers are popular because they are speedy and low to the ground. An example of a zero turn riding lawn mower can be found in U.S. Pat. No. 7,497,283. Most importantly, this type of mower can turn on a very short radius. For this reason, zero turn type mowers have improved productivity for landscapers, grounds maintenance and commercial lawn care crews. Aerators can be mounted onto zero turn mowers (as well as other mowers and tractors) to aerate the soil with penetrating tines. Aeration is of vital importance to any lawn care maintenance program. It is advantageous to attach aerators to the front of the mower because in that manner, the operator can observe and adjust the depth of aeration as needed.

Aeration entails creating numerous small holes in the ground to increase air and oxygen absorption into the soil, as well as seed germination. Often, in existing aerating equipment, the penetration depth of the aerator tines is determined by adding a weight on the aerator frame to force the tines into the ground. Typically, these tines do not effectively rotate bi-directionally, and once weighted, the rotor assembly incorporating the tines is essentially embedded in the ground. If the lawn equipment needs to move in a direction opposite to that in which it originally aerated the soil, the tines must be manually removed from the ground and lifted while the lawn equipment is repositioned. The same is true where the lawn equipment needs to make a turn. As such, a need exists for an improved lawn aerator that can be attached to a zero turn lawn mower, preferably at the front thereof, and moved along with the lawn mower, i.e. turn on a very short radius so that it can be continually utilized as the zero turn lawn mower is propelled in multiple directions, for example, when following the outline of an ornate flower garden.

SUMMARY OF THE INVENTION

The key to this invention is that it provides a steerable tine assembly. When used along with zero turning radius type lawn equipment, it allows an operator to take full advantage of the equipment's zero turn capability, enabling an operator to turn the lawn equipment and aerator attached thereto without starting and stopping, or restarting. This allows the operator to drive in any desired direction while aerating the soil without lifting the aerator out of the ground for each move and in particular without having to travel in a substantially straight line.

More specifically, the invention is a novel aerator attachment for zero turn lawn equipment that has a forward frame and forward end portion. The aerator includes a cross frame assembly, the cross frame assembly comprising at least one first frame member and a second frame member attached perpendicularly thereto, and at least one caster assembly mounted on the second frame member of the cross frame assembly.

The first frame members are pivotally attached to the forward end portion of the zero turn lawn equipment by a mounting means, such that the first frame members and hence the cross frame assembly are pivotal about an axis that is generally perpendicular to the ground.

The caster assemblies are rotatable about an axis that is generally perpendicular to the ground, and they include a means for retaining at least one tine rotor assembly independently rotatable thereon.

An actuating mechanism is also included. It has an extendible arm with two legs, the first leg being pivotally connected to the forward end of the lawn equipment about an axis that is generally parallel to the ground and the second leg pivotally connected to the second frame member of the cross frame assembly about an axis that is generally parallel to the ground. The actuating mechanism is mounted such that when the tine rotor assemblies are engaged and enter the ground that is to be aerated, the front end of the zero turn riding lawn lawn equipment is at least partially lifted off of the ground such that its front wheels are no longer engaged with the ground.

DETAILED DESCRIPTION OF THE INVENTION

Figure 1:
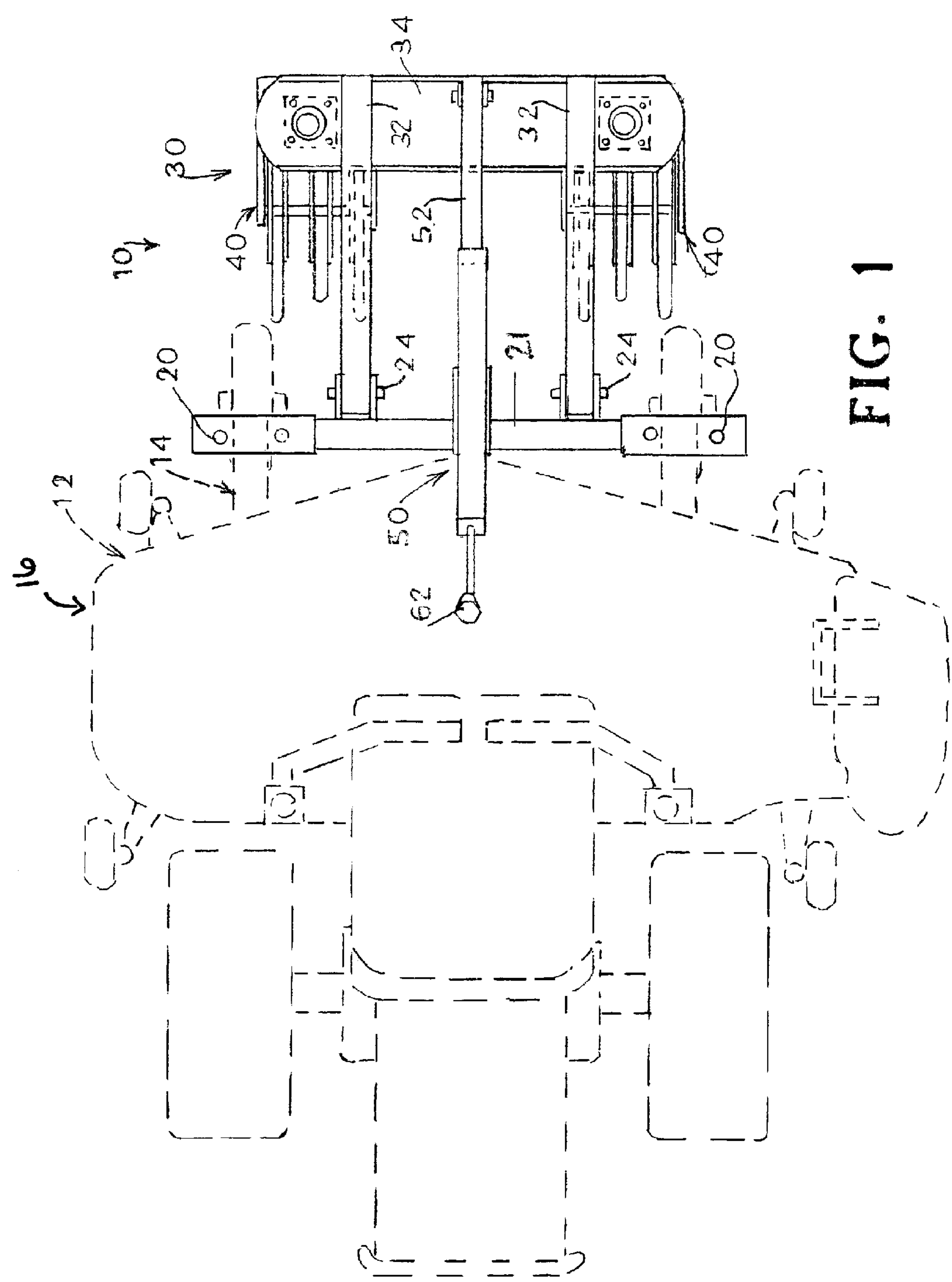
FIG. 1 is a top plan view of an aerator in accordance with the invention attached to the front end of a zero turn-type mower.

With reference to the Figures, the invention is a novel aerator attachment 10 for zero turn lawn equipment 12, illustrated in the form of a zero turn riding lawn mower, that has a forward frame 13 and a forward end portion 16. The aerator 10 includes a cross-frame assembly 30 and a mounting means 20 adapted to pivotally attach the cross-frame assembly 30 to the forward frame 14 of lawn equipment 12.

In the embodiment depicted in FIG. 1, mounting means 20 is a hitch comprised of a beam 21 that is generally parallel to the ground at a height approximately equal to the height of the forward frame 14 of the zero turn lawn equipment 12 and that extends across the width of the aerator attachment 10; attachment means (not shown in detail) for substantially rigidly yet removably attaching beam 21 to forward frame 14; and attachment means 24 for pivotally attaching cross-frame assembly 30 to mounting means 20 such that the cross frame assembly 30 is pivotal about an axis that is generally parallel to the ground. However, mounting means 20 can be any means suitable for pivotally connecting cross-frame 30 to the lawn equipment 12, and indeed can be a universal mount suitable for use with the cross-frame assembly 30 for aeration purposes, as well as for use in attaching other devices to the zero turn lawn equipment 12. The pivotal attachment allows the invention to travel across varying terrain during use.

The cross frame assembly 30 comprises at least one first frame member 32 having a front end and a rear end, and a second frame member 34 attached perpendicularly to first frame member 32, and at least one caster assembly 40, each caster assembly being fully rotatable and independently mounted on the second frame member 34 of the cross frame assembly 30.

The pivotal connection of the cross frame assembly 30 to the forward frame 14 is located, in the embodiment of FIG. 1, at the rear end of each first frame member 32, each such rear end being pivotally attached to the mounting means 20 by attachment means 24, such that the first frame member 32 is pivotal about an axis that is generally parallel to the ground. The front end of each first frame member 32 is attached to the second frame member 34. The length of first frame members 32 is sufficient to position second frame member 34 at a point sufficiently in advance of the front wheels of zero turn lawn equipment 12 to allow the caster assemblies 40 to freely rotate and to operate as hereinafter described. The second frame member 34 is of a sufficient weight, length, width, and strength to support the desired number of caster assemblies 40 and that allows the weight and pressure transfer to the caster assemblies 40 necessary for operation of the invention 10, as more particularly described hereafter. During use, and illustrated in FIGS. 2-4, the cross frame assembly 30 is generally parallel to the ground. This orientation maximizes the transfer of force in the desired direction from the lawn equipment 12 to the caster assemblies 40.

Figure 2:
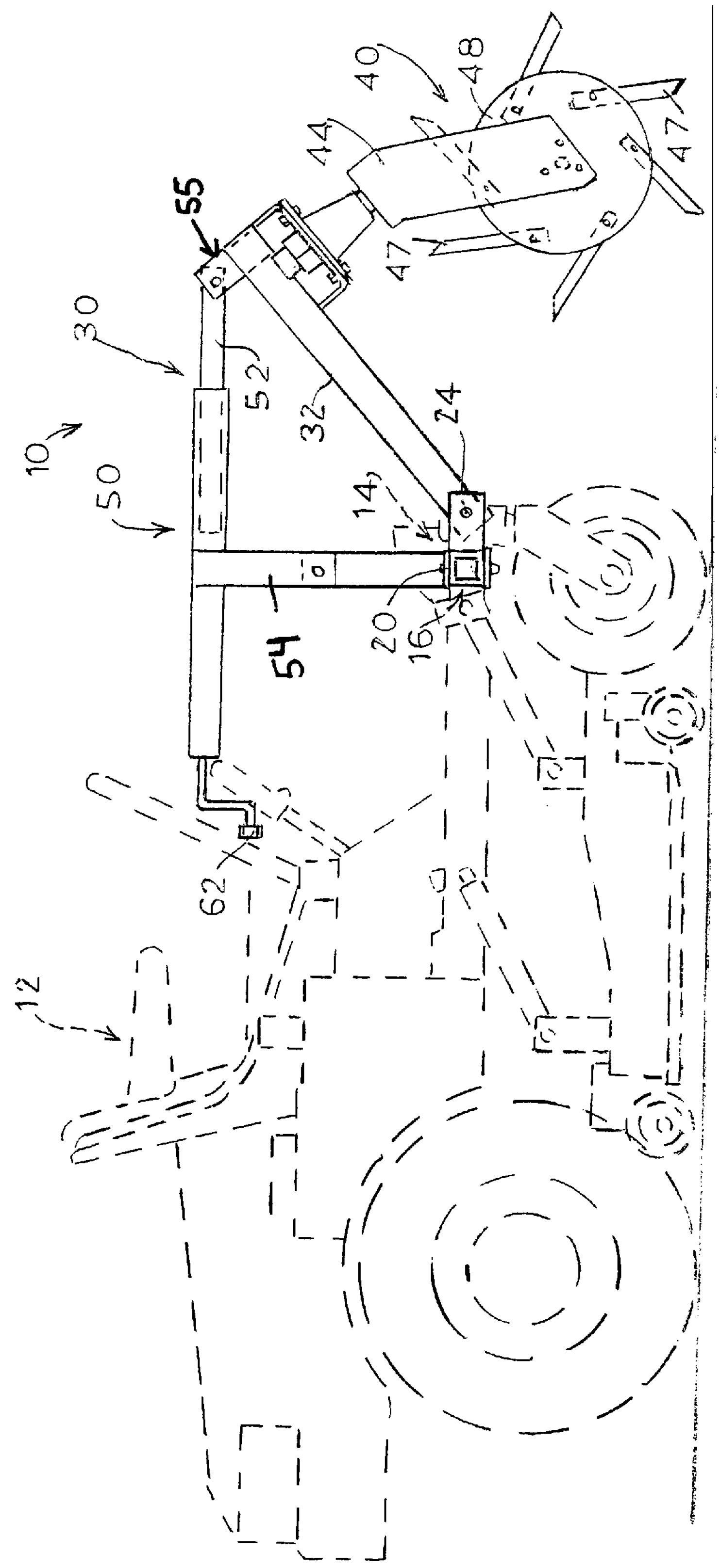
FIG. 2 is a side elevation view of the FIG. 1 aerator of the invention illustrating the mower wheels on the ground and the aerator in a raised position.

With reference to FIG. 2, the caster assemblies 40 are rotatable about an axis that is generally perpendicular to the ground and include a means for retaining 42 at least one tine rotor assembly 46 rotatably thereon. The tine rotor assemblies of each caster assembly may be attached to the caster assembly so as to rotate independently or in fixed relationship to each other. In embodiments employing multiple caster assemblies 40, the caster assemblies 40 preferably are mounted as close to each other as is possible without causing collisions between caster assemblies 40 during operation of the invention 10.

Figure 3:
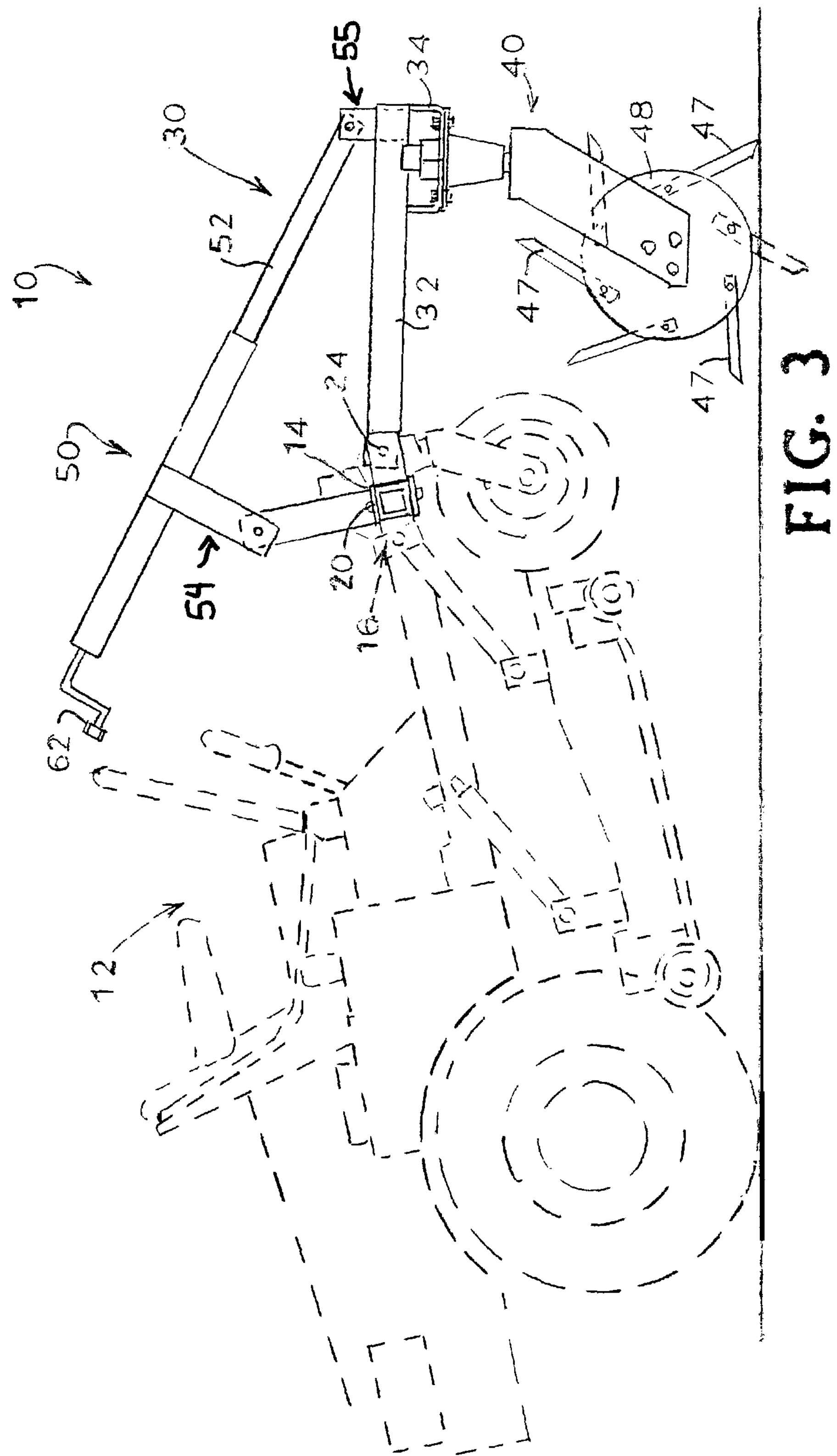
FIG. 3 is a side elevation view of the aerator of FIG. 2 illustrating the aerator in a ground engaged position with the lawn equipment device's front wheels lifted from the ground.

With reference to FIGS. 1-3, an actuating mechanism 50 is also included. It has an extendible arm 52 with two legs 54, 55 the first leg 54 being pivotally connected to the forward end 16 of the lawn equipment 12 about an axis that is generally parallel to the ground and the second leg 55 being pivotally connected to the second frame member 34 of the cross frame assembly 30 about an axis that is generally parallel to the ground. The second leg 55 in one embodiment is a bracket. The actuating mechanism 50 is mounted such that when the tine rotor assemblies 46 are engaged, the forward end 16 of the lawn equipment 12 is at least partially lifted off of the ground, see FIG. 3. The tine rotor assemblies 46 are thus forced into the ground using the weight of the lawn equipment 12.

Some prior art devices employ a wheel that is mounted onto the front end of the aerator attachment. The present invention 10 has no need for such a wheel. With reference to FIG. 3, the caster assemblies 40 essentially become the front wheels of the lawn equipment 12 during use. If an additional wheel were present at the front of the aerator 10, the caster assemblies 40 could be prevented from entering the ground when the front end of the lawn equipment 12 is lifted from the ground, making the invention 10 unsuitable for its intended use. The caster assemblies 40 must be engaged with the and penetrating the soil for aeration to be accomplished.

In essence, the actuating mechanism 50 is adjusted so that it is at a sufficient length to allow engagement of the tine rotor assemblies 46 into the ground at a depth desired by the operator. The tine rotor assemblies 46 penetrate the ground and may initially resist further vertical penetration. However, the actuating mechanism's pivotal arrangement allows further penetration of at least some portion of the tine rotor assemblies 46 when the lawn equipment 12 is driven in either direction. The pivotal connection allows the weight of the forward end 16 of the lawn equipment 12 to be transferred to the aerator 10 and accordingly to the tine rotor assemblies 46. The actuating mechanism 50 also allows the angle of the caster assemblies 30 to be adjustable while simultaneously allowing the tine rotor assemblies 46 to penetrate the ground. The weight of the front end 16 of the lawn equipment 12 is lifted upward, while the caster assembly 40 is driven in a horizontal direction identical to the horizontal motion of the lawn equipment 12 and in a generally vertically downward position. The penetration depth is controlled by adjusting the actuating mechanism 50 and by the condition of the soil to be aerated. For greater penetration depths, the mechanism 50 is extended, for lower penetration depths it is shortened.

In one embodiment of the invention, once the actuating mechanism 50 is adjusted for a specific terrain condition, it is fixed in place. However, it should be noted that the pivotal connection of the aerator 10, allows the forces, i.e. weight and/or pressure transferred to be adjustable based on the conditions of the terrain. The transfer of constant pressure to the caster assemblies 40 would impede their ability for rotation because of the varied nature of the terrain. The invention 10 would transfer more force when the soils are rough or dry, and less force when the ground is more pliable. Similarly, if the ground being serviced has areas that are elevated or depressed, the invention 10 is able to increase or decrease the amount of force transferred to the caster assemblies 40, thus allowing continued aeration.

Adjusting the actuating mechanism 50 also controls the depth of penetration of the tine rotor assemblies 46. During use, the tines 47 generally penetrate the ground about two to six inches. Generally, penetration of about two inches is sufficient for aeration. Depending on variables such as temperature, weather, and the condition of the soil, three inches of penetration may also be adequate. In certain embodiments, the means for retaining the tines also penetrates the ground to some extent. In this instance, more weight would be required to be transferred from the lawn equipment 12. In embodiments where less penetration is desired, less weight would be required to be transferred from the lawn equipment 12.

The invention 10 may be made of any material that allows sufficient momentum of the device during use, i.e. when attached to the lawn equipment 12. In other words, the materials of manufacture need to be of a sufficient weight and strength to allow the integrity of the invention to be maintained while the device is being propelled in any direction. Larger or heavier pieces of lawn equipment 12, designed for commercial operation, require the invention 10 to have more structural integrity and strength. Other smaller lawn equipment, like those used in private homes, may require less structural integrity and strength. The invention must be of a sufficient weight to allow the forces ordinarily exerted on the forward frame 14 of the lawn equipment to be transferred to the invention 10.

In one embodiment, the frame of invention 10 is made of iron. In other embodiments, the frame of the invention comprises aluminum or stainless steel. In one embodiment, the weight of the invention 10 is generally about 200 to 250 pounds, and is employed with lawn equipment 12 that is approximately 400 pounds.

During use, soil conditions may result in engagement of some of the tine rotor assemblies 46 into the ground at a different level than others. Generally speaking, however, the actuating mechanism 50 has sufficient power to raise the forward frame 14 of the lawn equipment 12 at feast partially off of the ground as the rotating tine rotor assemblies 46 penetrate the ground, as illustrated in FIG. 3. Penetration is not conditioned on the direction of the movement of the lawn equipment 12 or aerator 10. Forward motion and backward motion of the tine rotor assemblies 46 is expected during use of lawn equipment 12. The invention 10 allows ease of aeration by allowing the aerator to continually aerate without interruption for readjustment of the tines 47 during use and without having to raise the aerator from the ground in order to reposition the equipment. The caster assemblies 30 of the invention are adapted to go in both a positive and negative direction, while maintaining tine fork 46 penetration and force.

With reference to FIG. 1, the aerator 10 is mounted onto the frame 14 of lawn equipment 12 using any mounting means 20 known in the art to those familiar with lawn equipment. In one embodiment of the invention not illustrated in the figures, a hitch structure is attached to the rotatable cross frame assembly 30, the hitch structure has a means for removable connection (not shown) to the forward end 16 of the zero turn lawn equipment 12, such that the hitch structure moves along with and in advance of the lawn equipment 12 when the lawn equipment 12 is moving in a forward direction.

Figure 6:
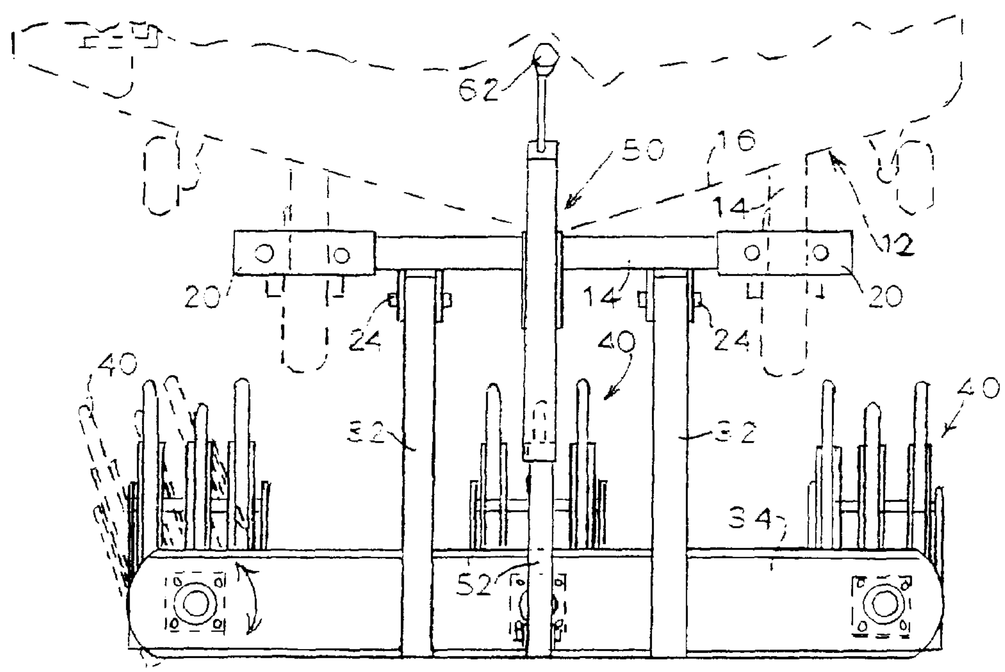
FIG. 6 is a top plan view of an alternative embodiment of an aerator in accordance with the invention.

With reference to FIGS. 1 and 6, the caster assemblies 40 may be mounted to each other on the second frame member 34 at any distance that allows independent fully rotatable movement. In certain embodiments, the caster assemblies 40 need not be fully rotatable, however. In those embodiments, the caster assemblies 40 may be more closely mounted to achieve the desired level of rotation. The caster assemblies 40 are generally identical to each other, but may be different in alternative embodiments. In one illustrative embodiment, FIG. 6, the invention 10 comprises three caster assembly units 40. In another illustrative embodiment, FIG. 2, the invention comprises two caster assembly units 40.

With reference to FIGS. 2 and 3, the caster assembly 40 includes a means for retaining at least one tine rotor assembly 46 such that each set of tine rotor assemblies 46 is rotatable about the retaining means. Any retaining means known to those of skill in the art may be employed. In one embodiment, FIG. 6, the caster assembly 40 includes three tine rotor assemblies 46; each rotatable about the retaining means. It should be understood by those of skill in the art that any number of tine rotor assemblies 46 might be employed in the present invention without departing from the spirit and scope of the invention. The tine rotor assemblies 46 are generally mounted onto the retaining means as a pair or in triplicate although greater or smaller numbers of tine rotor assemblies 46 may be mounted. In embodiments comprising three tine rotor assemblies 46, the tine rotor assemblies are generally mounted so that the two tine rotor assemblies 46 that are mounted distally are aligned with their tines parallel and at the same angle. The center tine rotor assembly 46 is mounted such that it is aligned with its tines disposed ninety degrees behind the other distally mounted tine rotor assemblies 46, as illustrated in FIG. 4.

The caster assembly 40 may be pivoted about an axis that is parallel to the ground to effectuate a preferred angle of entry for the tine rotor assembly 46. Depending on the soil conditions, certain angles of entry may be preferable over others. For example, if the soil is soft, the force on the tines and the entry angle may be less severe. This may be of value to landscapers who are unable to use some types of aerator devices in certain solid conditions. The aerator of the invention 10 may vary its pressure and angle of entry for the tine rotor assemblies 46. The angle of the pivot may be adjusted by adjustment of the actuating mechanism 50 to either shorten or extend the actuating mechanism 50.

Figure 4:
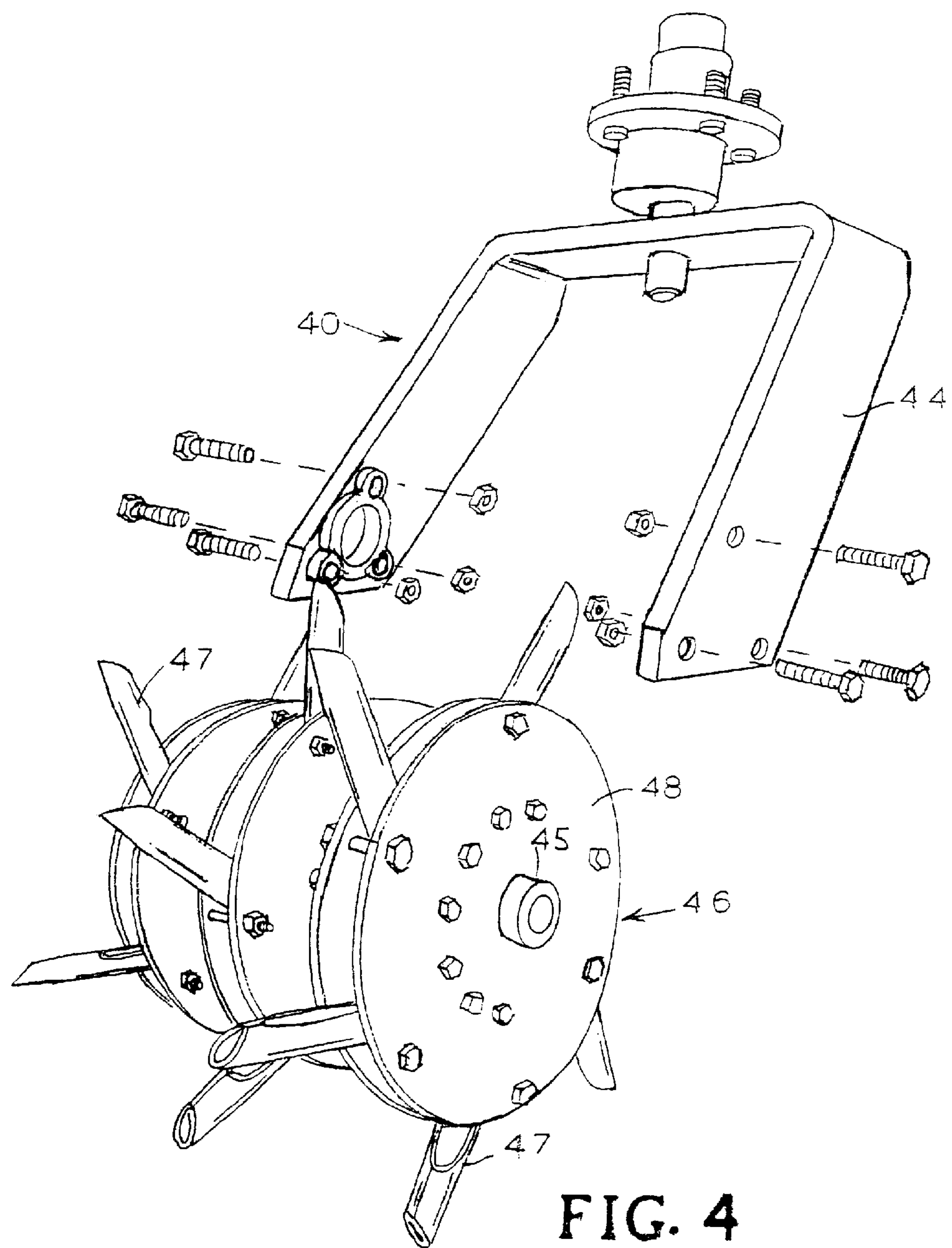
FIG. 4 is an exploded view of the elements of one embodiment of the caster assemblies.

In one embodiment of the invention 10 illustrated in FIG. 4, the caster assembly 40 comprises a u-shaped bar 44 and shaft 45 connecting the ends thereof as the retention means. The shaft 45 is attached to the u-shaped bar 44 by any means of attachment known to those of skill in the art. Means for attachment include, but are not limited to bolts, washers, screws, and pins. A rotor bearing may be employed at the ends of each shaft 45. Each tine rotor assembly 46, mounted on the shaft 45, is fully rotatable. As used herein, "fully rotatable" means rotatable 360° without interfering with adjacent assemblies, thereby permitting the mechanized equipment to make sharp turns without causing unwanted binding between assemblies. It is possible for tine rotor assemblies 46 mounted on different caster assemblies 40, to rotate in opposite or otherwise different directions, which facilitates turning of the equipment. In some embodiments of the invention, a shield (not illustrated) is attached to the caster assembly units 40 to block items from being thrown on the lawn equipment 12 or aerator 10.

Figure 5:
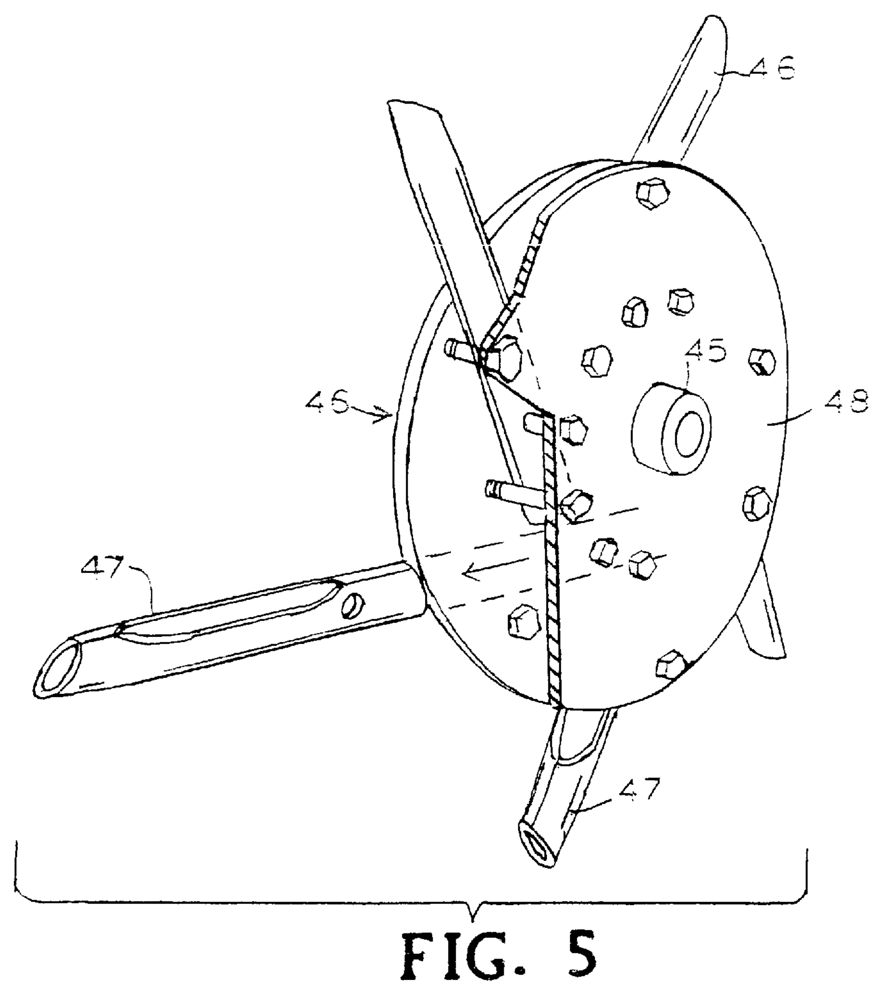
FIG. 5 is an exploded view of a tine rotor assembly of the invention.

With reference to FIG. 5 and in certain embodiments, the tine rotor assemblies 46 of the invention may be any commercially available tines rotor assemblies 46 that include core-type tines 47 attached within parallel plates 48. In an alternative embodiment a cultivator fork (not illustrated) is employed in the invention. In other alternative embodiments of the invention, any ground engaging tools may be employed, e.g. spikes, knives, cutter, disks instead of the core type tines 47. It should be noted that spoon-type tines currently available on the market are not suitable for use in the present invention. These spoon-type tines lack the ability for soil penetration that is associated with plugger aerators. If employed within the caster assemblies 40 of the invention, they would collapse under the pressure. In addition, in order to allow continual rotation of the tine rotor assemblies 46, and accordingly, the lawn equipment 12 during use, the tines 47 preferably should enter the ground at an approximately 45° angle. Entry at certain angles encourages continual and forward rotation of the tine rotor assemblies 46, by decreasing the amount of force necessary to effect rotation of the tine rotor assemblies 46 These spoon-type tines would not enter the ground at a useful angle that would allow continued rotation of the tine rotor assemblies 46. Moreover, lawn care professionals do not favor the currently available spoon-type tines. Such spoon type tines merely scrape the surface of the ground. Core-type tines are preferable to fully allow aeration to take place, for soil penetration, and for removal of soil plugs, all of which assist in promoting proper seed germination.

The tines 47 are generally cylindrical with hollow cores. Unlike many prior art devices, there is no additional weight added directly to the tines 47 to propel them into the ground during operation of the invention 10. Propulsion of the tines 47 into the ground is powered by pressure and weight being shifted from the front end 16 of the lawn equipment 12 and eventually down through the tine rotor assemblies 46. The tine rotor assemblies 46 are designed to penetrate the ground to an appropriate depth, while being adjustable to prevent over-deep insertion. The actuating mechanism 50 of the invention is adjustable to allow the aerator to control the penetration depth, for example to adjust for varying soil conditions.

With reference to FIGS. 4-5, the tines 47 are attached to the plates 48 of the tine rotor assemblies 46 by any means for attachment known in the art. They may be attached by welding or by other attachment means, including, but not limited to screws, washers, and bolts. The tines 47 are generally mounted within the plates 48 in a manner such that the length and angle of protrusion allow the tines 47, when the tine rotor assemblies are in use during aeration, to penetrate the ground at a level sufficient to aerate the ground contacted by the tines 47. In one embodiment of the invention, the tines 47 are mounted at a 45° angle with respect to shaft 45. This angle allows for ease of rotation of the tine rotor assemblies 46 during operation of the invention 10.

The tines 47 preferably are removably mounted between plates 48 so that if one tine 47 is damaged, the tine rotor assembly 46 may nevertheless remain operational. Typically the plates 48 of the tine rotor assembly are welded to shaft 45, and shaft 45 is mounted within the caster assembly with a rotor bearing (not shown) at each end of the rod, in a manner that permits shaft 45 and rotor assemblies 46 to rotate. However, a removable tine rotor assembly, such as that shown in U.S. Pat. No. 6,758,283 could alternatively be employed. In the FIG. 2 embodiment as more clearly depicted in FIGS. 4 and 5, the tines 47 are mounted between two plates 48 by a bolt that is placed through the body of the tine 47, substantially perpendicular to the length of the tine, and secured at each end to a plate 48. At least one, preferably, two other bolts are used to maintain the integrity of the alignment of the tine 47 within the plates 48. Preferably, each bolt is inserted through one plate 48, into the space separating the two plates 48 so as to contact or come close to contacting the exterior of the tine 47, as illustrated in FIG. 5, and preferably through the second plate 48, but do not penetrate any portion of the tine 47. Thus, these additional bolts provide support for the tine 47 without the necessity of placing further holes in the tine 47, which could weaken it.

The aerator assembly 10 is pivotally mounted onto the frame 14 as previously described, which allows the cross-frame assembly 30 to pivot relative to the frame 14 at any point between a ground engaging position and a disengaged position. The invention further comprises an actuating mechanism 50 that in an embodiment depicted in FIG. 3 could be described as a jack or as a dual lever-type connector. Actuating mechanism 50 includes an extendible arm 52 with two legs 54, 55, extending downwardly therefrom. The first leg 54 is pivotally connected to the forward end of the lawn equipment 12 about an axis that is generally parallel to the ground, the pivotal connection being formed at a point along the length of first leg 54, selected to permit the first leg 54 to effectively function as a lever; and the connection to the forward end of the lawn equipment 12 being by means of a fixed beam that forms part of mounting means 20 and that does not itself pivot, although other suitable means for connecting the first leg 54 to lawn equipment 12 could be used. The second leg 55 is pivotally connected to the second frame member 34 of the cross frame assembly 30 about an axis that is generally parallel to the ground, the pivotal connection being formed at the upper end of second leg 55 substantially at its point of attachment to extendible arm 52. Actuating mechanism 50 is mounted and adjusted to an appropriate length such that when the tine rotor assemblies 46 are engaged, the front end 16 of the lawn equipment 12 is lifted off of the ground. The actuating mechanism 50 can be spring loaded in some embodiments, allowing the penetration of the tine rotor assemblies 46 to be adjustable to the terrain during use.

The actuating mechanism 50 may be either manual or powered and may be attached by any known means for attachment. Further, any known wiring and tubing that allows the operator of the mower to control operation of the mechanism when electrically and/or hydraulically powered is within the scope of the invention. A switch may be employed. In one embodiment of the invention, illustrated in FIGS. 1, 2, 3, and 6, a crank 62, is employed to allow the operator of the mower to control operation of the mechanism. Rotation in one direction extends the arm 52, while rotation in the opposition direction shortens it.

The actuating mechanism 50 allows the cross frame assembly 30 of the invention to pivot up or down with respect to the ground by either extending or retracting the arm 52. When the arm 52 is extended, the aerator is in its ground engaging position. As the lawn mowing equipment 12 moves forward when arm 52 is in its extended position, the tines 47 of the tine rotor assemblies 46 begin to dig into the ground and the legs of extendible arm 52 pivot and the weight of the lawn equipment 12 is effectively shifted forward to the tine rotor assemblies 46, thereby pivoting the front end 16 of the lawn equipment 12 at least partially off the ground, FIG. 3. However, when the arm 52 is retracted, the arm 52 and its legs 54, 55 pivot the aerator assembly 10 upward off the ground, disengaging the tines 47 from the ground, and allowing the front end 16 of the lawn equipment 12 to rest on the ground, FIG. 2. Unlike many prior art aerators, the back wheels of the lawn equipment 12 stay on the ground during operation. It should be noted that the back wheels of conventional zero turn lawn equipment provide the traction and power that drives the equipment in the desired direction, while the front wheels are used to steer the device. The invention when in aeration operation, with the rear wheels of the lawn equipment 12 on the ground and the front wheels off the ground, effectively replaces the front wheels, or steering wheels, with the caster assemblies 40, allowing the caster assemblies 40 to function as the steering wheels of the lawn equipment 12. This retention of back wheel function provides stability of the device, as well as traction and power for continued movement of the lawn equipment 12 and caster assemblies 40 during aeration. The caster wheel assemblies, functioning as steering wheels and capable of full rotation, preserve the zero turn capability of the lawn equipment during aeration.

In one embodiment of the aerator 10, a handle (not shown), or other lifting means allows for ease of lifting and lowering the actuating mechanism 50 and the aerator assembly 10. Both manually lifting means and powered lifting means are contemplated to be within the scope of the present invention. The powered lifting means could include electric as well as hydraulic means.

During use, the tine rotor assemblies 46 are placed into the ground once, and then are each able to rotate in any direction without a need to come out of the ground when the direction of the lawn equipment 12 changes. Each tine rotor assembly 46, when the tine rotor assemblies 46 are mounted on shaft 45 in a manner enabling free rotation, independently engages the ground because they are separately mounted on the caster assemblies 40. In any event, each caster assembly 40 independently engages the ground because each is separately and independently mounted onto the cross frame assembly 30. This allows the tine rotor assemblies 46 to adapt to different types of terrain without the need to reengage.

The aerator of the invention 10 is not generally used along with an additional wheel assembly as is found with prior art aerators. During operation, as illustrated in FIG. 3, the caster assemblies 40 generally act as the front wheels of the zero turn lawn equipment 12, thereby eliminating the need for additional wheels. Although additional wheels could be added, the use of inappropriately mounted additional wheels could limit the ability of the zero turn lawn equipment to turn corners efficiently and in any event such wheels represent an unnecessary expense.

In one embodiment of the invention, a lawn aerating system is provided that comprises at least one of the aerators 10 herein described and a piece of zero turn lawn equipment 12.

In another embodiment of the invention, a lawn aerator is provided comprising a cross frame assembly 30 capable of being pivotally attached to the zero turn lawn equipment 12, but without providing the mounting means 20 for such purpose.

The above description describes the invention in sufficient detail to enable one skilled in the art to make and use the invention. It should be noted, however, that those of skill in the art could make many embodiments of the invention without departing from the spirit and scope of the invention.

What is claimed:

1. An aerator attachment for zero turn lawn equipment having a forward end portion and a forward frame the aerator attachment comprising:
- a mounting means adapted to attach to the zero turn lawn equipment such that the means for attachment is pivotal about an axis that is generally parallel to the ground;
- a cross frame assembly pivotally connected to the mounting means such that the cross frame assembly is pivotal about an axis that is generally parallel to the ground, the cross frame assembly comprising at least one first frame member and a second frame member attached perpendicularly to each other;
  - wherein the first frame member is pivotally attached to the mounting means such that it is pivotal about an axis that is generally parallel to the ground;
- at least one caster assembly, each fully rotatable in 360 degrees and reversible without requiring disengagement from the ground and independently mounted onto the second frame member of the cross frame assembly, the at least one caster assembly rotatable about an axis that is generally perpendicular to the ground when the attachment is engaged, the at least one caster assembly comprising a means for retaining at least one tine rotor assembly fully rotatable thereon; and
- an adjustable actuating mechanism comprising an extendible arm with two legs, the first leg being pivotally connected through the mounting means to the forward end of the lawn equipment about an axis that is generally parallel to the ground and the second leg pivotally connected to the second frame member of the cross frame assembly about an axis that is generally parallel to the ground, the actuating mechanism mounted such that when the tine rotor assemblies are engaged the front end of the lawn equipment is adjustably at least partially lifted off the ground to allow adjustable depth penetration by the tine rotor assemblies.

2. The aerator attachment of claim 1 wherein the actuating mechanism is manual.

3. The aerator attachment of claim 1 wherein the actuating mechanism is electric or hydraulic.

4. The aerator attachment of claim 1 wherein the actuating mechanism is spring loaded.

5. The aerator attachment of claim 1 comprising three caster assemblies.

6. The aerator attachment of claim 1 comprising two caster assemblies.

7. The aerator attachment of claim 1 wherein the means for retaining at least one tine rotor assembly comprises a u-shaped bar with two ends and a shaft connecting the two ends, having at least one tine rotor assembly rotatably mounted thereon.

8. The aerator attachment of claim 7 wherein the tine rotor assembly is independently and fully rotatably mounted thereon.

9. The aerator attachment of claim 1 further comprising a shield attached to at least one caster assembly.

10. The aerator attachment of claim 1 wherein the actuating mechanism comprises a crank.

11. The aerator attachment of claim 1 wherein the mounting means is a hitch.

12. The aerator attachment of claim 1 wherein the cross frame assembly is manufactured from a material selected from the group consisting of iron, aluminum or stainless steel.

13. A lawn aerating system comprising a zero turn lawn device and the aerator of claim 1.

14. A means for aerating a lawn comprising exerting forward pressure onto the aerator attachment of claim 1.

15. The aerator attachment of claim 1 wherein the at least one tine rotor assembly comprises at least one hollow tine.

16. An aerator attachment for zero turn lawn equipment having a forward end portion and a forward frame, the aerator attachment comprising:
- a mounting means adapted to attach to the zero turn lawn equipment such that the means for attachment is pivotal about an axis that is generally parallel to the ground;
- a cross frame assembly pivotally connected to the mounting means such that the cross frame assembly is pivotal about an axis that is generally parallel to the ground, the cross frame assembly comprising a pair of first frame members, in parallel orientation to each other, and a second frame member attached perpendicularly to each of the first frame members;
  - wherein the pair of first frame members are pivotally attached to the mounting means such that they are pivotal about an axis that is generally parallel to the ground;
- three caster assemblies, each fully and independently rotatable in 360 degrees and reversible without requiring disengagement from the ground and independently mounted onto the second frame member of the cross frame assembly, the caster assemblies fully rotatable about an axis that is generally perpendicular to the ground when the attachment is engaged;
  - each caster assembly comprising a u-shaped bar having two ends connected by a shaft having multiple tine rotor assemblies fully rotatably mounted thereon; and
- an adjustable actuating mechanism comprising an extendible arm with two legs, the first leg being pivotally connected through the mounting means to the forward end of the lawn equipment about an axis that is generally parallel to the ground and the second leg pivotally connected to the second frame member of the cross frame assembly about an axis that is generally parallel to the ground, the actuating mechanism mounted such that when the tine rotor assemblies are engaged the front end of the lawn equipment is adjustably at least partially lifted off the ground to allow adjustable depth penetration by the tine rotor assemblies.

17. An aerator attachment for zero turn lawn equipment having a forward end portion and a forward frame, the aerator attachment comprising:

a cross frame assembly adapted for pivotal attachment to the forward frame of the zero turn lawn equipment such that the cross frame assembly is pivotal about an axis that is generally parallel to the ground, the cross frame assembly comprising at least one first frame member and a second frame member attached perpendicularly to each other;

wherein the first frame member is attached to the mounting means such that it is pivotal about an axis that is generally parallel to the ground;

at least one caster assembly, each fully rotatable in 360 degrees and reversible without requiring disengagement from the ground and independently mounted onto the second frame member of the cross frame assembly, the at least one caster assembly rotatable about an axis that is generally perpendicular to the ground when the attachment is engaged, the at least one caster assembly comprising a means for retaining at least one substantially cylindrical hollow tine rotor assembly fully rotatable thereon;

an adjustable actuating mechanism comprising an extendible arm with two legs, the first leg being pivotally connected through the mounting means to the forward end of the lawn equipment about an axis that is generally parallel to the ground and the second leg pivotally connected to the second frame member of the cross frame assembly about an axis that is generally parallel to the ground, the actuating mechanism mounted such that when the tine rotor assemblies are engaged the front end of the lawn equipment is adjustably at least partially lifted off of the ground to allow adjustable depth penetration by the tine rotor assemblies.

* * * * *